United States Patent
Petit-Huguenin

(10) Patent No.: US 10,644,938 B1
(45) Date of Patent: *May 5, 2020

(54) SERVER-BASED SERVICE CONFIGURATION SYSTEM AND APPROACH

(71) Applicant: 8x8, Inc., San Jose, CA (US)

(72) Inventor: Marc Petit-Huguenin, Saratoga, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/591,310

(22) Filed: May 10, 2017

Related U.S. Application Data

(60) Division of application No. 14/570,014, filed on Dec. 15, 2014, now Pat. No. 9,667,488, which is a continuation of application No. 11/193,027, filed on Jul. 29, 2005, now Pat. No. 8,943,180.

(51) Int. Cl.

| | | |
|---|---|---|
| H04L 12/24 | (2006.01) | |
| H04L 29/12 | (2006.01) | |
| H04L 29/08 | (2006.01) | |
| H04L 29/06 | (2006.01) | |
| H04L 12/26 | (2006.01) | |
| H04L 12/58 | (2006.01) | |

(52) U.S. Cl.
CPC ...... H04L 41/0816 (2013.01); H04L 41/0873 (2013.01); H04L 43/10 (2013.01); H04L 61/1511 (2013.01); H04L 67/1036 (2013.01); H04L 67/42 (2013.01); H04L 51/12 (2013.01); H04L 61/2007 (2013.01); H04L 67/02 (2013.01)

(58) Field of Classification Search
CPC . H04L 41/0816; H04L 43/10; H04L 67/1036; H04L 61/1511; H04L 41/0873; H04L 67/42
See application file for complete search history.

(56) References Cited

U.S. PATENT DOCUMENTS

| | | |
|---|---|---|
| 6,219,700 B1 | 4/2001 | Chang et al. |
| 6,438,652 B1 | 8/2002 | Jordan et al. |
| 6,922,724 B1 | 7/2005 | Freeman et al. |
| 7,222,228 B1 | 5/2007 | Stephens et al. |
| 7,308,475 B1 | 12/2007 | Pruitt et al. |

(Continued)

*Primary Examiner* — Jackie Zuniga Abad
(74) *Attorney, Agent, or Firm* — Crawford Maunu PLLC

(57) ABSTRACT

Network service providers are managed using a server-side configuration approach. According to an example embodiment of the present invention, a host network location includes two or more servers that automatically reconfigure their services in response to controller service settings corresponding to each server. Each server reads configuration information provided at a controller such as a domain name server (DNS), and in response, starts a network-based service corresponding to the configuration information. For instance, each of the two or more servers may be adapted to provide mail service via simple mail transfer protocol (SMTP) and web service via hypertext transfer protocol (HTTP). In this regard, when a DNS associates a first one of the servers with HTTP services and a second one of the servers with SMTP services, each server reconfigures its services accordingly, e.g., at a selected configuration time after startup or in response to an initiating event.

20 Claims, 3 Drawing Sheets

(56) References Cited

U.S. PATENT DOCUMENTS

| | | |
|---|---|---|
| 8,943,180 B1 | 1/2015 | Petit-Huguenin |
| 2002/0032766 A1* | 3/2002 | Xu .......................... H04L 29/06 709/223 |
| 2003/0088660 A1 | 5/2003 | Florman et al. |
| 2003/0105865 A1 | 6/2003 | McCanne et al. |
| 2004/0006586 A1 | 1/2004 | Melchione et al. |
| 2005/0015471 A1 | 1/2005 | Zhang et al. |

* cited by examiner

SERVER-BASED SERVICE CONFIGURATION SYSTEM AND APPROACH

FIELD OF THE INVENTION

The present invention relates to communication systems, and more particularly, to Internet-protocol (IP) systems involving servers providing network-based services.

BACKGROUND OF THE INVENTION

The use of network-based communications such as those involving the Internet have grown exponentially in recent times for a variety of purposes, and has resulted in increased data traffic over telecommunications networks and at particular network-based communications nodes. The development of the Internet has made broad-based individual home and business access by web-based implementations readily available, with rapidly increasing numbers of services available via the Internet. Applications related to the Internet involve commercial applications, education, research, news dissemination and recreation.

Web servers, email (electronic mail) servers, network access systems, network access appliances, communications data paths and data sources have also grown in number and technological ability in order to meet the growing needs of network users and consumers. Furthermore, the cost of equipment used for Internet access, such as computers, modems and network routers has dramatically reduced as manufacturing technologies improve. These reductions in cost have been accompanied by a dramatic increase in speed and functionality, making Internet access easier, faster and more reliable. These reductions have facilitated the growth of home and business use of the Internet. As network communications increase, the need for a greater number of network resources (e.g., servers) has also grown.

One particular aspect of internet service is related to internet telephony service. Internet telephony generally involves the transfer of voice data over internet communications links in data packets. Internet telephony access appliances, typically internet protocol (IP) telephones or conversion devices that change IP telephony data into conventional telephony data (e.g., non-packetized data) that is subsequently sent to a conventional (non-IP) telephone. In providing Internet telephony, it is important that data being streamed is not interrupted and thus that any server providing data transfer capabilities can handle the amount of traffic that it is being subjected to. Signaling portions of Internet telephony communications, such as those involved in the establishment of a telephone communications connection, are important in facilitating uninterrupted connection.

Many network providers implement multiple sources for user access to a web page (or multiple web pages in the context of a web site), to an email server or to data for downloading or other purposes. One aspect of network-based communications and the provision of information on the network involves web hosting, where multiple users (sometimes, thousands or more) can access a particular web site and any related content otherwise available at that web site. Another aspect of network-based communications that has come under particular demand involves the delivery of data such as software or purchased media such as music. Where the delivery of such data is involved, there are often many sources available to provide the data and many communications data paths over which the data can be delivered. For example, where a host source provides software for downloading, that source often makes the downloading available from a variety of sources, and often requests that a user downloading the data designate a source. In these applications, user demands related to the sheer number of users accessing a particular web site and/or to the download of information relating to data provided by a particular web site can be significant, particularly as the number of users having network access grow and as such network-based service is more significantly relied upon.

Many Internet applications work with a client/server model. The client sends a request, and the server answers this request. Examples of client programs are web browsers; mailers, instant messaging applications and internet telephones, as discussed above. Three pieces of information that typically need to reach a server are the transport protocol (e.g., TCP, UDP), the IP address and the port. It is possible to manually configure this information in the client, but doing this can limit the scalability and reliability of the service.

In many applications, a domain name is mapped to a particular list of IP addresses; where one address fails, the domain name server (DNS) uses another IP address in the list. Generally, the DNS must ensure that any alternate IP address meets the needs of a particular request. That is, where a particular service is requested, any re-routing of a domain name to another server must involve a process that includes making a determination as to what services are available at any potential re-routed server locations. Furthermore, any changes on the server side must match information available on the DNS, such that services started on a particular server are limited to those listed at the DNS.

The continued growth in demand for network sources for information access, data provision and other needs has presented challenges, including those discussed above, to the ability of previous approaches to meet user and consumer needs, and further to facilitate the modification and configuration of servers.

SUMMARY OF THE INVENTION

The present invention is directed to network-based systems and approaches to the management of services related thereto. The present invention is exemplified in a number of implementations and applications, some of which are summarized below.

According to an example embodiment of the present invention, a network-based server arrangement implements automatic server-side reconfiguration of network-based services in response to administrative service assignment settings. This approach is implemented, e.g., with two or more host servers providing their respective network-based services as administratively assigned at an administrator, such as a domain name server (DNS), with automatic self-configuration by each host server to correspond to the assigned services.

According to another example embodiment of the present invention, a network server hosting approach involves the implementation of multiple network servers to host a particular network service. Selection of services to be provided on a particular server is effected on the server side, in response to the particular type of service associated with the server at a host via which users request server access. Each server responds to a particular designation at the host by reconfiguring its services and starting those services commensurate with services designated at the host.

According to another example embodiment of the present invention, a network-based server system includes two or more servers configured for hosting a common set of services to which a particular domain name is mapped. Each server provides at least two services such as a mail service (simple mail transfer protocol—(SMTP)) and web service (hypertext transfer protocol—(HTTP)), with the services generally configured at startup of the servers. Each server polls a domain name server used to provide user access to the server, and compares its IP address with IP addresses available at the domain name server. If a match is found, the server further looks to the domain name server to identify a type of service associated with its IP address, starts a service that corresponds to the identified service type and, where appropriate, stops services that no longer correspond to identified types of services associated with its IP address. When a request for access to the network-based server system is sent by a user to a host, information available in the request is used by the domain name server to identify one of the servers that can service the request, and the request is sent to the identified server.

According to another example embodiment of the present invention, a network server arrangement includes at least two servers and an administrator arrangement, such as a DNS. Each server is configured and arranged to provide common network-based services, e.g., such that a particular network-based service could be implemented at one or both servers. The administrator arrangement is configured and arranged to assign at least one network-based service type to each server, to receive client requests for a particular network-based service and, in response to each client request, to provide information to the requesting client for use in selecting one of the servers assigned to a network-based service that matches the client's requested service. Each of the at least two servers is adapted to automatically poll the administrator arrangement to identify network-based services assigned to the server, and, in response to the polling, to automatically reconfigure its network-based services to correspond to network-based services assigned to the server by the administrator arrangement. In this regard, each server actively updates its configuration (e.g., after an initial configuration at startup), with configuration settings at the administrator arrangement not necessarily contemplating the configuration at the at least two servers.

In another example embodiment of the present invention, a clustered host domain server arrangement is adapted for use with active reconfiguration of network-based services. The clustered host domain server includes at least two clustered servers and a DNS. Each of the clustered servers is configured and arranged to provide at least two common network-based services to clients via the Internet. The DNS stores a set of tuples for the host domain, the tuples indicating the type of services assigned to each of the at least two clustered servers, the type of transport protocol for each service and the IP address associated with each service at each of the at least two clustered servers. Each of the at least two clustered servers automatically reconfigures its network-based services to correspond to the tuples at the DNS associated with each clustered server. The DNS is further configured and arranged to respond to a client request by providing information for use in identifying, as a function of information in the request and the tuples, one of the at least two clustered servers that is configured to serve the request. Once a particular one of the clustered servers is identified, the client uses an IP address for the identified clustered server to service its request.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
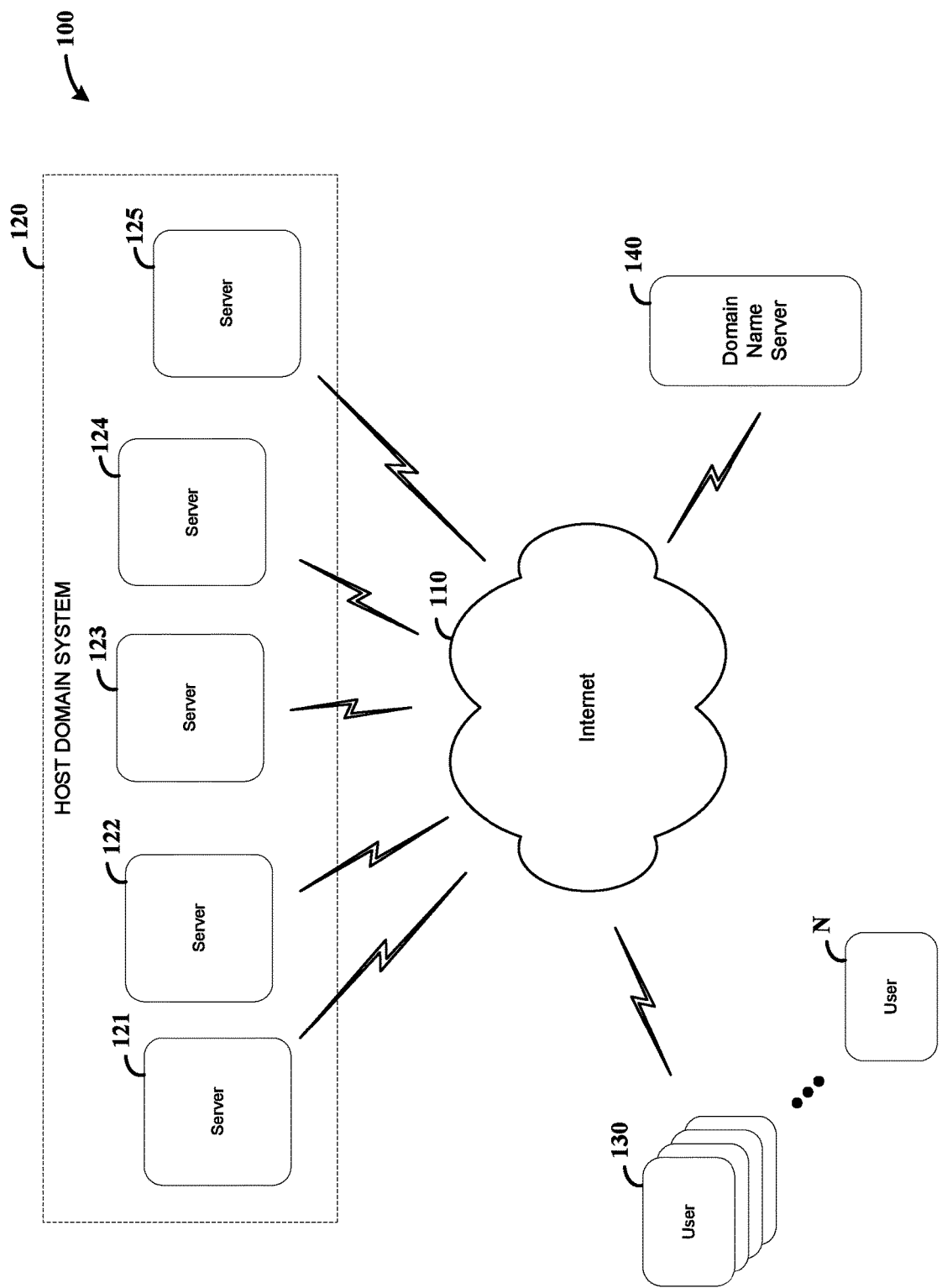
FIG. 1 is a network-based communications system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to various types of network-based systems, and has been found to be particularly suited to such systems requiring or benefiting from the provision of information via multiple servers on a packet-based communications network. While the present invention is not necessarily limited to such systems, various aspects of the invention may be appreciated through a discussion of various examples using this context.

According to an example embodiment of the present invention, a server system is implemented with a control approach that facilitates server selection and service implementation in the context of a multitude of clients potentially accessing one or more servers in the system, with server-side selection and configuration relative to service characteristics requested by the clients. The server system includes two or more network servers, each network server adapted to provide at least two different service functions common among both servers, such as functions for HTTP (hypertext transfer protocol) service, SMTP (simple mail transfer protocol) service, Internet telephony service (voice over Internet Protocol (VoIP) service) and/or FTP (file transfer protocol) service. The number of servers is commensurate with the number of different types of services to be provided by the particular server system, plus additional servers, where appropriate, to meet load needs, provide backup and/or provide alternates for use when performing maintenance on a particular server.

A host server such as a domain name server maintains a list of IP addresses for each server in the server system and associates each IP address in the list with a particular type of service. This type of service can be selectively modified or changed at the host server, depending upon the needs for access to the server system or other relative needs with any associated network.

The two or more network servers are adapted to respond to the host server list (configuration) by configuring their respective services to the particular type of service associated with the network server's IP address at the host server. That is, where a particular network server is selected for providing a service to clients, the host server list is modified to indicate the particular type of service for which the network server is selected to perform. In response to selection, the particular network server uses information in the selection (e.g., a portion of a URL or internee protocol (IP) address provided by the host server) to determine the type of service desired by the client. Once the service type is determined, the particular network server carries out functions that facilitate the determined service, with active facilitation involving reconfiguration in response to a change in selected service.

In another example embodiment of the present invention, a host server application includes a domain name server (DNS) administrator arrangement and two or more function servers assigned to a common domain name. The common domain name is associated with different services sought by clients (users) implementing the domain, such as via an HTTP request, SMTP request, FTP request or telnet request. When the DNS is configured, an administrator (human or automatic) associates each specific function server with a particular type of service by associating each server's IP address with the service type and, where appropriate, with particular parameters such as transport protocol and port. When each function server starts, it accesses the DNS and looks for an IP address that matches its own IP address (i.e., as associated with a network card at the function server). Once the proper service is started at the function server, client requests passed to the function server via the DNS are serviced accordingly.

In one implementation, the DNS provides information for use in selecting one of the servers in the host server application using a weighted approach, together with the aforementioned approach for assigning services to a particular server. Each of the servers is assigned a weight relative to other servers, with heavily weighted servers selected more often, relative to lesser weighted servers, using information in the DNS. In this regard, users accessing a list of available servers in the DNS select a server to use based upon the weighting as well as the type of service assigned to the server by the DNS.

In another implementation, the DNS assigns service functions to each of the servers in the host server application using the availability and other characteristics of each server. For example, where a particular set of servers is adapted to handle a balanced load of requests, the DNS may assign functions to each of the servers based upon the total number of servers available and the load-carrying ability of each server. The load condition may be determined using capacity for each host server, where the load condition for each server is compared to other servers and an expected amount of requests for a particular service type.

Servers capable of handling higher loads are generally assigned services that demand higher loads. Where a particular domain handles more email requests (STMP) than web page requests (HTTP), the DNS generally assigns STMP functions to servers capable of handling relatively higher volume. For instance, where two servers are available for a particular domain and that domain must host both STMP and HTTP functions, the DNS server assesses the expected volume of STMP and HTTP requests, compares the load handling capacity of the servers and assigns the service type associated with the higher expected volume to the server having a higher load capacity.

In another implementation, the servers at the domain are configured to check the DNS configuration on a periodic basis to determine the type of service that each server is to provide, with each server reconfiguring in response to a change in type of service assigned thereto. This approach is useful, for example, to ensure that changes made to the DNS configuration are reflected on a timely basis at each server and, further that there are no mismatches between the DNS and a particular server. In certain applications, the DNS is further adapted to signal one or more of the servers at the domain when the configuration at the DNS has been changed. In response to this signal, the server or servers access the DNS, determine a particular service type associated with the server in the DNS and, if different than a current service type configuration of the server, reconfigure for providing the service type associated in the DNS.

Turning now to the figures, FIG. 1 is a network-based communications system 100, according to an example embodiment of the present invention. The system 100 includes a host domain system 120 with a plurality of servers 121, 122, 123, 124 and 125 adapted to interface with a domain name server (DNS) 140 and respond to requests from users 130-N via the Internet 110 (or other applicable network). In some applications, the domain name for the host domain system 120 is associated with a particular IP address and individual servers therein including the IP address of the domain with additional address information associated specifically with each server. While shown coupled (communicatively) with the Internet 110, the DNS 140 may alternately be coupled directly to one or more of the servers 121-125. Further, the DNS 140 may be implemented in multiple locations using multiple DNS implementations with the IP addresses of each of the servers accordingly implemented as discussed below.

Each of the servers 121-125 is configured with multiple service functions for handling different requests from the users 130-N. These service functions may include functions such as those implemented for HTTP, STMP, FTP, instant messaging functions, internet telephone functions or others. Each of the servers 121-125 is further configured to implement one of the particular service functions in response to the particular type of service associated with each server by the DNS 140.

Upon startup, each of the servers 121-125 accesses the DNS 140 and looks for a match between its IP address and an IP address listed at the DNS. If a server finds a match, the server configures itself for providing a service type that is associated with its IP address in the DNS. If a match isn't found for a particular server, that server is not configured for providing any particular type of service, or if applicable, is maintained in whatever service type configuration the server is already set to. A reconfiguration approach is implemented to ensure that the each server's configuration is current, with each server polling the DNS 140 to obtain current configuration information. The polling may involve, for example, initiation by the server itself, a response by the server to a notification from the DNS 140, or a response by the server to the binding or unbinding of an IP address on the server. In certain applications, servers poll by responding to information received in connection with a notification from the DNS 140 as discussed above. In some applications, non-matching servers periodically poll the DNS 140 at a relatively higher rate to monitor whether a new association with the server's IP address has been entered into the DNS.

Generally, information used for configuration of each server includes a transport protocol (e.g., transmission control protocol (TCP) or user datagram protocol (UDP)), the IP address of the server and the port via which the server is to provide a particular service. In some instances, a particular service for the host domain system 120 is selectively associated with multiple ones of the servers 121-125 to distribute the load, or to have a failover in case of maintenance, or network problem. Priority assigned to particular servers can be used for failover, where a next available server is implemented upon failure of a server connection, Weighting is optionally used to balance the load between servers of same priority.

Once each server (or at least one server) is configured, the DNS 140 can direct user requests to the host domain system 120 by providing server information to requesting clients (users). When one of the users 130-N attempts to access the host domain system 120, that user implements a URL identifying a service type and domain name associated with the host domain system to make a request for network access. The DNS 140 receives the access request from the user and returns the identification of one or more of the servers 121-125 that are associated with the URL and that also provide the type of service in the URL. If more than one server at the host domain system 120 is capable of servicing the request, the user selects one of the servers using the information provided by the DNS 140, and in some applications, one or more of a variety of other approaches, such using random, weighted or load capability selection. These other approaches may be further specified in the DNS 140, such as where the DNS provides a weighting associated with the available servers.

In some implementations, the servers 121-125 are adapted to periodically check the DNS 140 for any change in assigned service function. If a new assigned service or parameter is found for a particular server, that server reconfigures accordingly.

In other applications, the DNS 140 is configured to notify a server if its configuration as the DNS is changed. The server can then access the DNS 140, ascertain new assignment information and reconfigure itself accordingly. Another approach involves the notification from the DNS to the server that includes information identifying the new configuration, which is used by the server to reconfigure itself (without necessarily accessing the DNS 140).

The network-based communications system 100 can be implemented using one or more of a variety of approaches. The following discussion is intended to exemplify a particular such approach, in connection with the above discussion, with particular characteristics assigned to different parts of the system as shown for purposes of this discussion. In this regard, a variety of other network service approaches are carried out with the system 100, depending upon the application.

For purposes of discussion, the host domain system 120 is assigned the domain name "hostdomain.com" and assigned the IP address "10.10.10.0." Each of the servers 121-125 are respectively assigned. IP addresses "10.10.10.121," "10.10.10.122," "10.10.10.123," "10.10.10.124" and "10.10.10.125." The DNS 140 then stores information associating each server's IP address with a particular service, e.g., as a set of tuples (ordered values) bound to a domain name, with parameters, priority and weighting as follows with, e.g., the priority and weighting associated with the tuples:

| Weight | Priority | Service | Transport | I-P Address | Port |
|---|---|---|---|---|---|
| 100 | 1 | HTTP | TCP | 10.10.10.121 | 80 |
| 100 | 1 | HTTP | TCP | 10.10.10.122 | 80 |

-continued

| Weight | Priority | Service | Transport | I-P Address | Port |
|---|---|---|---|---|---|
| 100 | 2 | HTTP | TCP | 10.10.10.123 | 8080 |
| 100 | 1 | SMTP | TCP | 10.10.10.123 | 23 |
| 100 | 2 | SMTP | TCP | 10,10.10.124 | 23 |

Upon startup or at another appropriate time, each of the servers 121-125 accesses the DNS 140 (and, where appropriate, another similar DNS provisioned at the server) and attempts to match its respective IP addresses to an IP address in the DNS 140, In this regard, servers 121 and 122 configure themselves to respectively run an HTTP service using a TCP transport protocol on port 80. Server 123 configures itself to run an HTTP service using a TCP transport protocol on port 8080, and further to run an SMTP service using TCP transport protocol on port 23. Server 124 configures itself to run an SMTP server using TCP transport protocol on port 23. Server 125 does not find a match and thus does not configure itself in any new manner specified by the DNS 140.

Referring again to FIG. 1, when user 130-N wishes to access the host domain system 120 using an HTTP service such as for accessing a website hosted by the host domain system called "www.hostdomain.com," that user enters the domain name into his or her web browser as "http://www.hostdomain.com." In response, a domain name server accessible via the Internet 110 converts the domain name into the IP address associated with the domain name "10.10.10.0". The domain name server that performs this conversion may be the DNS 140 or another domain name server, such as typically implemented with an Internet service provider (ISP) via which the user 130-N accesses the Internet 110 or with one of a multitude of domain name servers that service the Internet.

The DNS 140 then directs the user 130-N requesting "http://www.hostdomain.com" to server 121, 122 or 123 by providing information about the servers, such as indicating current conditions associated with each server. For example, if one of servers 121 or 122 is available, server 123 is not used because it has a lower priority (2) relative to servers 121 or 122 (each having a priority of 1). If only one of servers 121 or 122 is available, the user 130 implements the information from the DNS 140 and sends the request to the available server. If both of servers 121 and 122 are available, the user 130-N sends the request randomly to one of the servers, as each server is assigned an equal weight (100). If neither of servers 121 or 122 is available and server 123 is available, the user 130-N sends the request to server 123. If none of the servers 121-123 are available, an error can be returned to the user sending the request. A similar approach is used for SMTP requests, with a selection made using the information provided by the DNS 140 relative to an available one of servers 123 or 124. If a connection to one of the servers fails, the user 130-N can attempt to send a request to another one of the servers, if available as identified by the DNS 140, using an approach similar to that above (i.e., selecting an available server by weight and priority).

In one implementation, one or more servers execute the following approach in discovering DNS servers/associated tuples and appropriately configuring in response to the tuples. For each domain provisioned at the server, the server retrieves a set of tuples bound to the domain. For each tuple (e.g., indicating service, transport, IP address and port), and for each IP address bound to a network interface card (NIC)

on the server, if the bound IP address is equal to the IP address in the tuple, the service named in the tuple is started by using the transport, IP address and port in the tuple. Where the above conditions aren't met, services are not started. Once the tuples and servers are set, client requests can be serviced by providing the tuples to the client, together with weighting and priority information, with the client trying the corresponding servers until a successful response is achieved. This approach can be implemented using, e.g., the system 100 in FIG. 1.

In some applications, the above discovering approach is implemented iteratively. The process is periodically re-executed to facilitate tuple updates. Considering first and second (subsequent) discovering iterations, services existing in the first tuples list but not in the second tuples list are stopped upon and/or after the second iteration. Services existing in the second tuples list but not in the first tuples list are started. Services existing in both tuples lists are not modified. After execution of the second iteration, the first tuples list is replaced at the server by the new list and used in the next iteration. This approach is relative, e.g., to polling approaches discussed herein.

In certain applications, one or more servers is registered with the DNS to receive notification updates when a tuples list is updated and/or when an IP address of the server is bound or unbound. In response, the above discovery approach is re-initiated at these registered servers, with the updated tuples list replacing the existing tuples list, where the updated tuples list is associated with the particular registered server re-initiating the discovery approach.

Figure 2:
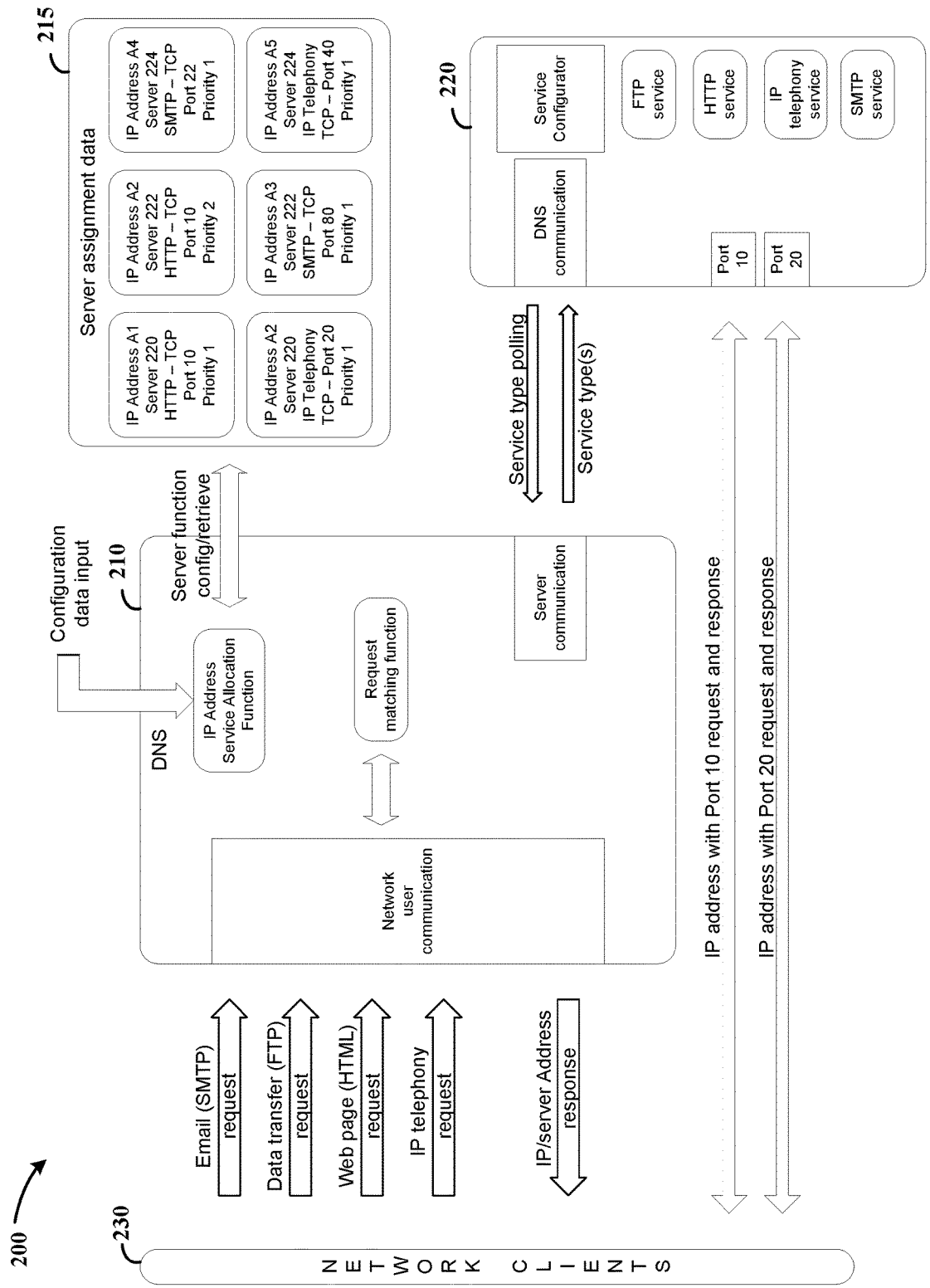
FIG. 2 is a host clustered network service arrangement, according to another example embodiment of the present invention.

FIG. 2 is a host network service arrangement 200 for serving user requests, according to another example embodiment of the present invention. The approach shown in FIG. 2 may, for example, be implemented with the network-based communications system 100 shown in FIG. 1.

A DNS 210 interacts with a plurality of client servers including server 220, using server assignment data stored at a database 215, to provide network-based services to a plurality of network clients 230. The server assignment data corresponds to data for at least four servers, 220, 222 and 224, with servers 222 and 224 illustratively omitted here for brevity. Server 220 is programmed with functions for providing one or more of FTP service, HTTP service, IP telephony service (e.g., VoIP) and SMTP service.

The DNS 210 receives configuration data as an input to an IP address service allocation function for setting up services at each of the servers 220-224. The configuration data input and/or internal programming at the DNS 210 is used to generate server assignment data that is stored (e.g., in the form of tuples) at the database 215. The DNS 210 subsequently accesses the database 215 for servicing requests for network-based services by one or more of the network clients 230 received via a network user communication function, with a request matching function implemented to use the server assignment data to match client requests with a particular client server.

Each server communicates with the DNS 210 via a server communication function at the DNS. Using server 220 as an example, the server polls the DNS 210 via a DNS communication function to identify the service type that is to be provided at the server, and the DNS returns service types to the server. In response, a service configurator at the server 220 configures the server for the network service specified by the DNS 210 using the server assignment data stored at the database 215. The particular network service is assigned to one of ports 10 and 20. In this regard, once the server 220 is initially configured at startup (or, upon startup, not configured with any particular service), the polling approach is implemented to effect reconfiguration, including first-time configuration, at a later time and in response to changes at the DNS 210.

When one of the network clients 230 sends a request (e.g., for email (SMTP), data (FTP), web page (HTML) or IP telephony) to the DNS 210, the DNS returns information to the client for use in communicating with an appropriate server, such as discussed above in connection with FIG. 1. In applications where the server assignment data includes priority and/or weight data, and where more than one server is configured to serve the request, the DNS 210 sends such priority and/or weight data to the client 230. The one of the network clients 230 then uses the response from the DNS to send a request to an appropriate server, with such a request (and corresponding service response) shown by way of example with both ports 10 and 20 at server 220.

Figure 3:
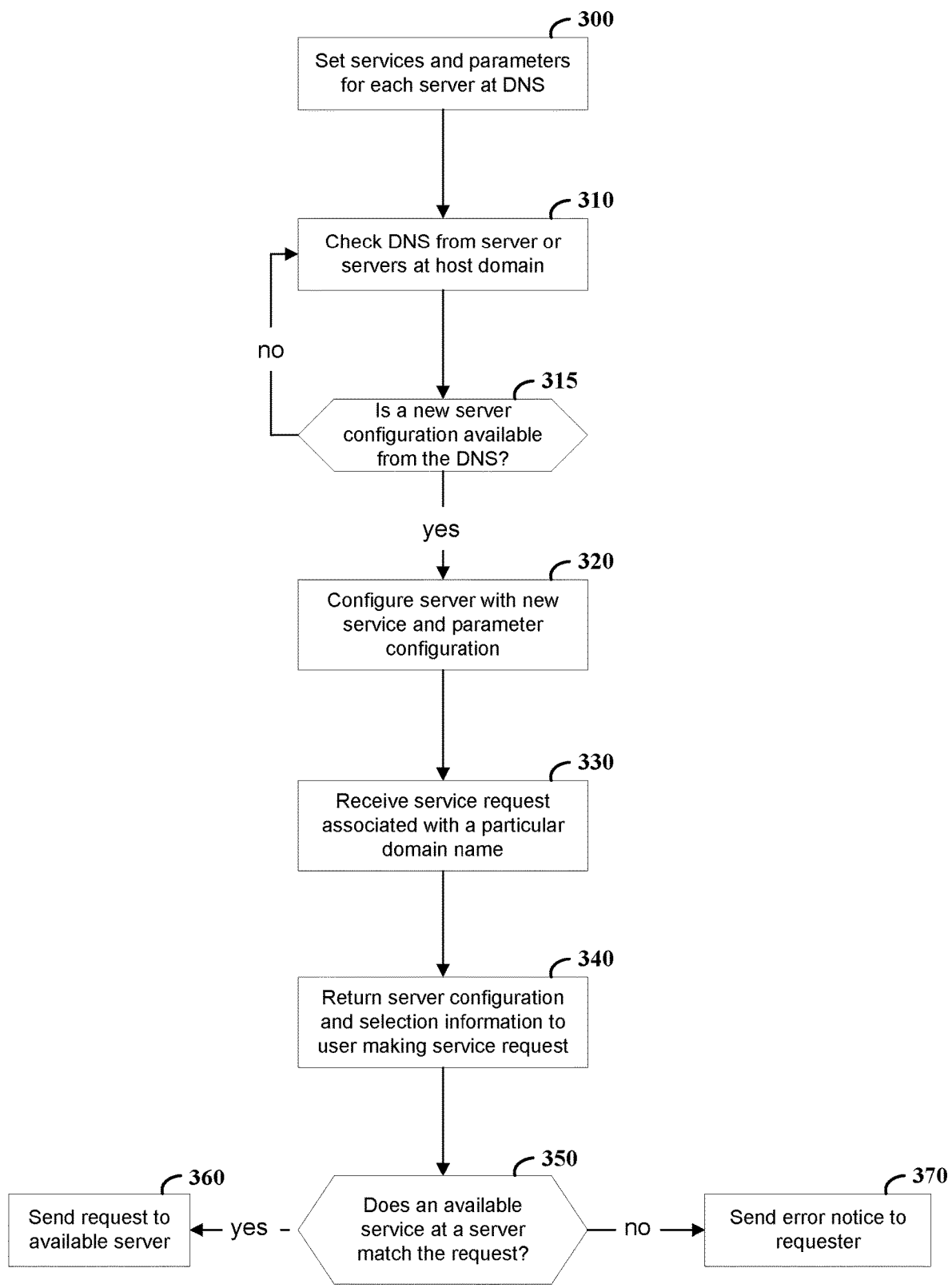
FIG. 3 shows a flow diagram for processing requests for network-based services, according to another example embodiment of the present invention.

FIG. 3 shows a method for hosting network-based services with automatic reconfiguration at host servers, according to another example embodiment of the present invention. At block 300, services and parameters are set for one or more servers at a particular domain by a DNS server, with the services and parameters associated with the one or more servers in a list accessible to the DNS server. At block 310, one (or more) of the servers check the DNS for updated configuration information relating to assigned services and/or parameters. The check at block 310 is performed, e.g., upon startup of a server, on a periodic interval or upon initiation by the DNS.

If new server configuration information is not available at block 315, the server (or servers) are not reconfigured and the process repeats at block 300 as described above, with the services and parameters being set (e.g., being maintained or set with new information). This approach discussed with the series of method blocks 300-315 may be implemented with some or all of a particular set of servers associated with a host domain as shown, for example, in FIG. 1 above.

If new configuration information is available at block 315, the server (or servers) is configured with new services and/or parameters as indicated with the DNS at block 320. At block 330, a service request bearing information identifying a domain name (or associated IP address) and a service type is received at the DNS, The DNS returns information characterizing available servers (if any) for servicing the request at block 340. If an available service at the selected server matches the request at block 350, the requesting party uses the information to select and send the request to a matching server at block 360. If a server does not match the request at block 350, an error message is returned to the requesting party at block 370. The process continues at block 300 for serving other requests and/or making changes to configuration at one or more servers.

In another example embodiment of the present invention, a listening-point element is implemented in connection with servers used for providing services in response to client requests. This listening point element may be implemented, for example, in connection with the port approach as discussed above with example applications described using FIG. 1 and/or FIG. 2. The listening-point element generally describes certain IP addresses, ports and/or protocols on which a specific application must listen for incoming requests. These same addresses, ports or protocols can also be used to send a request in certain applications such as those involving a proxy. In this regard, the listening-point element or elements implemented in connection with this approach may involve server-based listening point elements that listen for a request for a particular service session as directed, e.g., by a DNS.

In some applications, the listening-point element includes a universal resource identifier (URI) attribute that includes a valid session initiation protocol (SIP) URL, that when resolved indicates an address, port and/or protocol to use (e.g., a set of tuples) in listening for a client/user request, with a scheme portion of the URI indicating a particular service to use. Results from the listening point element's function (e.g., listening) are compared to a list of IP addresses binded to the NIC of the local machine. Applications that have at least one interface that match to IP addresses "heard" by the listening point element are started (e.g., in some implementations, only these applications are started). For example, where a machine has HTTP, SMTP and internet telephony applications associated with a listening point element and where the listening point element's function indicates that HTTP and internet telephony addresses are present in requests, the machine starts the HTTP and internet telephony applications but does not start the SMTP application.

While the present invention has been described with reference to several particular example embodiments, those skilled in the art will recognize that many changes may be made to the present invention. For example, other embodiments of the present invention can include a combination of one or more aspects discussed herein. Such modifications do not depart from the spirit and scope of the present invention.

What is claimed is:

1. A system comprising:
    a network interface circuit (NIC),
    a computer server that includes the NIC and that is configured to be assigned a plurality of Internet Protocol (IP) addresses by a domain name server (DNS), the computer server configured to:
        identify services that are assigned to the NIC of the computer server and associated with an IP address of the plurality of IP addresses;
        configure itself to provide the services, in response to identifying the services;
        identify IP addresses and ports corresponding to the services, each service corresponding to a different application having an interface associated with at least one IP address and port;
        listen, on one or more ports corresponding to the identified IP addresses and ports, for a service request;
        compare at least one IP address for the service request to the plurality of IP addresses that are assigned to the NIC;
        identify at least one of the different applications by comparing an IP address of the interfaces to at least one IP address for the service request; and
        start, on the computer server and in response to identifying the at least one of the different applications, the at least one of the different applications.

2. The system of claim 1, wherein the computer server is further configured not to start other available services in response to IP addresses assigned to the other available services not matching the at least one IP address for the service request.

3. The system of claim 1, further including the DNS configured to balance service requests for a domain name shared between the computer server and at least one other computer.

4. The system of claim 3, wherein the DNS is configured to modify a DNS record to balance service requests for a domain name.

5. The system of claim 4, wherein the DNS is configured to modify the DNS record by adding, to the DNS record, IP addresses assigned to NICs of the computer server and associated with corresponding services.

6. The system of claim 4, wherein the DNS is configured to provide an IP address to a client based upon a priority indicated within the DNS record.

7. The system of claim 4, wherein the DNS record includes a transport type.

8. The system of claim 1, wherein the computer server is further configured to disable, in response to subsequent polling of the DNS, at least one enabled service.

9. The system of claim 1, wherein the DNS is configured to provide a notification to the computer server in response to a change in configuration of the DNS.

10. The system of claim 9, wherein the change in configuration of the DNS includes a change to an IP address that is also assigned to the NIC of the computer server.

11. The system of claim 1, wherein the computer server is further configured to periodically poll the DNS and to enable and disable services in response to changes to services that include an IP address that is assigned to the NIC of the computer server.

12. The system of claim 1, wherein the NIC includes a card and the NIC and the card are configured and arranged as a network interface card integrated as part of the computer server.

13. A method for providing network-based services, the method comprising:
    receiving configuration data as an input to an internet protocol (IP) address service allocation function, the configuration data corresponding to network-based services to be established at each of a plurality of computer servers having a network interface circuit (NIC);
    generating server assignment data via a domain name server (DNS) in response to receipt of the configuration data, and providing the server assignment data to the plurality of computer servers;
    accessing the configuration data in response to receipt of a communication from a client of the network-based services, the communication including a servicing request for one of the network-based services;
    identifying at least one application associated with the service request by comparing at least one IP address for the service request to IP addresses and ports in the configuration data, wherein each service corresponds to a different application having an interface associated with at least one IP address and port; and
    provisioning a computer server among the plurality of computer servers to provide the application to the client.

14. The method of claim 13, including accessing the configuration data in response to polling from the computer server, and reconfiguring the computer server in response to the polling and based on a change in the configuration data.

15. The method of claim 13, including providing a notification to the computer server that configuration data assigned to the computer server has changed.

16. The method of claim 14, wherein the computer server is configured to identify services that are assigned to the NIC of the computer server by polling a DNS record of a DNS server and the method further includes the computer server automatically configuring itself to provide the services in response to the polling.

17. The method of claim 14, further including identifying the configuration data in response to the polling, the configuration data including a transport protocol, an Internet Protocol (IP) address of the computer server, and a port of the computer server that the computer server uses for providing the services.

18. The method of claim 13, further including periodically polling, by the computer server, the DNS, and, in response, enabling and disabling services responsive to changes to services that include an IP address that is assigned to the NIC of the computer server.

19. The system of claim 1, wherein the computer server is configured to identify services that are assigned to the NIC of the computer server by polling a DNS record of the DNS server and automatically configures itself to provide the services in response to the polling.

20. The system of claim 19, wherein the computer server is configured to automatically configure itself by initiating the polling of the DNS record of the DNS server and, in response, obtain and use current configuration data for configuring itself.

* * * * *